US010554094B2

(12) United States Patent
Hochstetler et al.

(10) Patent No.: US 10,554,094 B2
(45) Date of Patent: Feb. 4, 2020

(54) TERMINAL BLOCK COVER FOR USE IN INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 157 days.

(21) Appl. No.: 15/820,859

(22) Filed: Nov. 22, 2017

(65) Prior Publication Data
US 2019/0157940 A1 May 23, 2019

(51) Int. Cl.
H02G 3/08 (2006.01)
H01R 13/46 (2006.01)
H02K 5/22 (2006.01)
H01R 9/24 (2006.01)
H02K 7/18 (2006.01)

(52) U.S. Cl.
CPC .......... *H02K 5/225* (2013.01); *H01R 9/2416* (2013.01); *H02K 7/1823* (2013.01)

(58) Field of Classification Search
CPC .. H02K 5/225; H02K 7/1823; H02K 2213/03; H02K 5/22; H01R 9/2416; H01R 13/46; H01R 43/20; H01R 13/02; H01R 9/00; H01R 11/12; H01R 9/24; H01R 9/2408; H01R 9/2458; H01R 11/11; H02G 3/08; H02G 3/081; H02G 3/14

USPC ...... 174/149 B, 66, 67, 135, 50, 520, 138 R, 174/138 F; 439/113, 114, 110, 521, 892, 439/893, 737, 709, 723, 590, 725
See application file for complete search history.

(56) References Cited

U.S. PATENT DOCUMENTS

| 4,273,408 A | * | 6/1981 | Orr | ...................... | H01R 9/2491 439/709 |
| 4,609,246 A | * | 9/1986 | Ustin | ...................... | H01R 9/223 439/590 |
| 5,483,213 A | * | 1/1996 | Mueller | ................. | H01H 71/08 335/132 |

(Continued)

FOREIGN PATENT DOCUMENTS

JP 2008-17693 A 1/2008

OTHER PUBLICATIONS

European Search Report for EP Application No. 18207081.3 dated Apr. 2, 2019.

*Primary Examiner* — Angel R Estrada
(74) *Attorney, Agent, or Firm* — Carlson, Gaskey & Olds, P.C.

(57) ABSTRACT

A terminal block cover for use in an integrated drive generator has a body having a closed outer face and extending to an open inner face, and having an open side and a closed side. There are four connection channels for receiving electric connections for each of three phases of power and a neutral, and they extend from the closed side to the open side. There are spacing channels formed between adjacent ones of each of the four connection channels, with the spacing channels being formed by two spaced ribs with an interior space. An integrated drive generator and a method are also disclosed.

13 Claims, 3 Drawing Sheets

(56) References Cited

U.S. PATENT DOCUMENTS

| | | | | |
|---|---|---|---|---|
| 8,313,343 B2* | 11/2012 | Grosskopf | ............ | H01R 9/223 |
| | | | | 439/113 |
| 9,472,996 B2* | 10/2016 | Hochstetler | ............ | H02K 5/225 |
| 10,158,184 B2* | 12/2018 | Boisnier | ................. | H01R 4/34 |
| 2012/0190250 A1 | 7/2012 | Patel et al. | | |
| 2013/0299138 A1 | 11/2013 | Colson et al. | | |
| 2016/0290473 A1 | 10/2016 | Lemmers, Jr. et al. | | |
| 2018/0254678 A1* | 9/2018 | Matsuzaki | ............... | H02K 3/04 |

* cited by examiner

TERMINAL BLOCK COVER FOR USE IN INTEGRATED DRIVE GENERATOR

BACKGROUND

This application relates to a terminal block cover for the power output terminal of an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

There is a terminal block for the power leaving the integrated drive generator. The cover, which encloses the terminal connection, faces design challenges.

SUMMARY

A terminal block cover for use in an integrated drive generator has a body having a closed outer face and extending to an open inner face, and having an open side and a closed side. There are four connection channels for receiving electric connections for each of three phases of power and a neutral, and they extend from the closed side to the open side. There are spacing channels formed between adjacent ones of each of the four connection channels, with the spacing channels being formed by two spaced ribs with an interior space.

An integrated drive generator and a method are also disclosed.

These and other features may be best understood from the following drawings and specification.

DETAILED DESCRIPTION

Figure 1A:
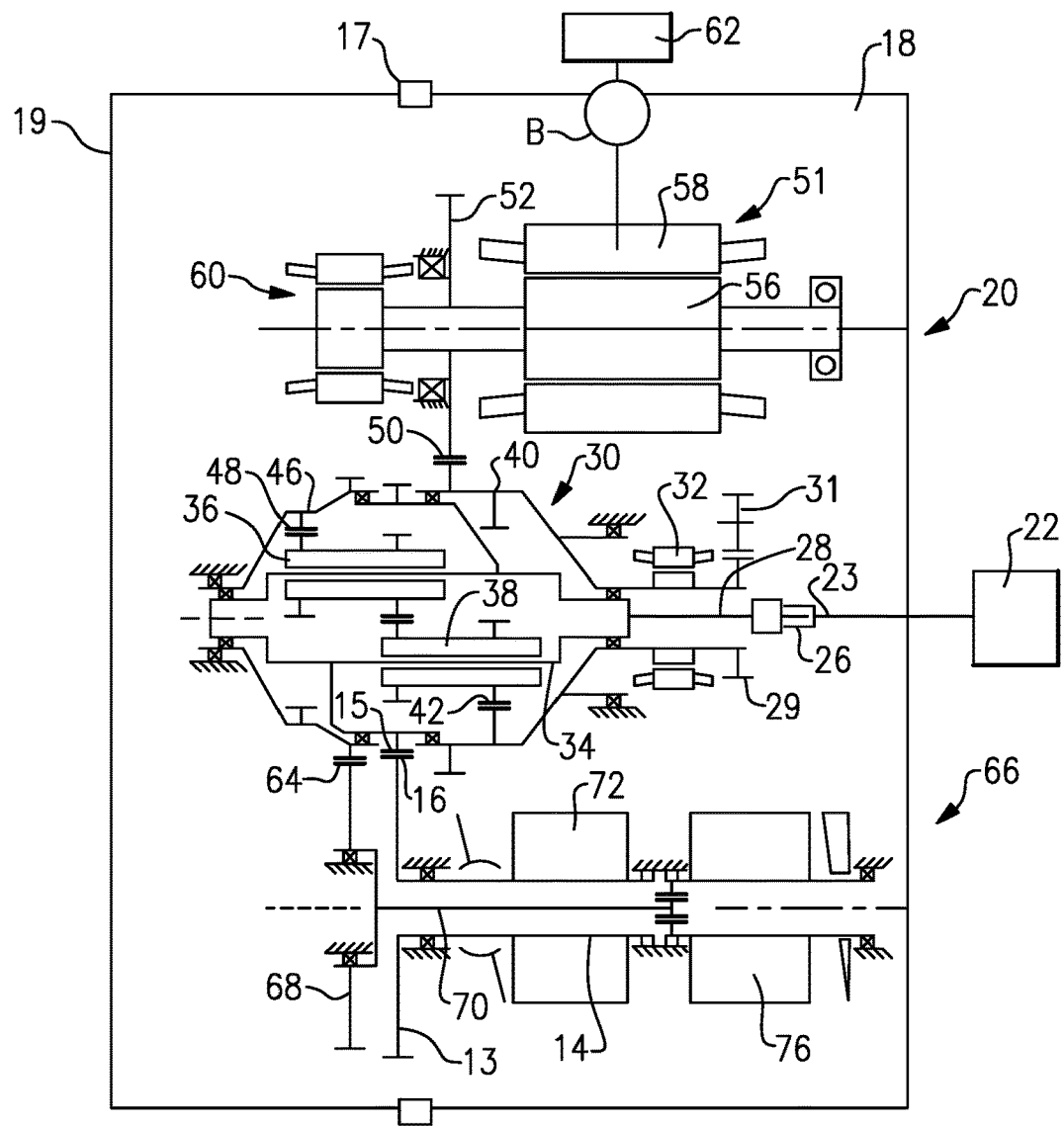
FIG. 1A schematically shows an integrated drive generator.

FIG. 1A shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator 51 having a drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. A worker of ordinary skill would recognize that the desired frequency and speed at use 62 would dictate a number of design functions.

As can be appreciated, the power leaving the integrated drive generator 20 to the uses 62 must pass through a terminal at the area schematically shown at B.

Figure 1B:
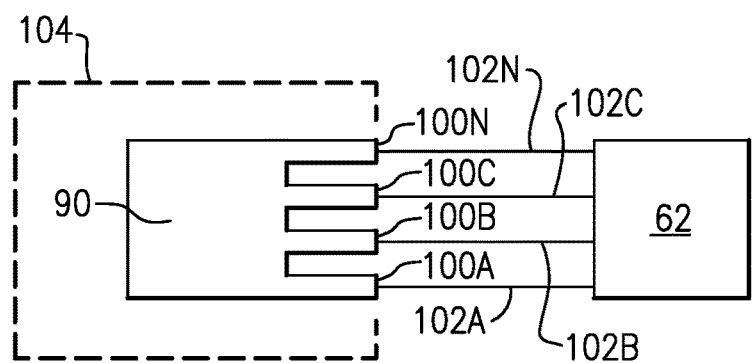
FIG. 1B shows a detail of the area B from FIG. 1A.

FIG. 1B schematically shows detail of the area B. As shown, an output terminal 90 has a plurality of discrete connections shown schematically here. Three phases of power are supplied from electrical connections 100A, 100B, and 100C. A neutral 100N is also included. A plurality of wires 102N, A, B and C connect to the uses 62. Thus, power is supplied to uses 62. A terminal block cover 104 is identified by a body 105 (FIGS. 2A-2E) and covers the connections 100A, 100B, 100C and 100N.

Figure 2A:
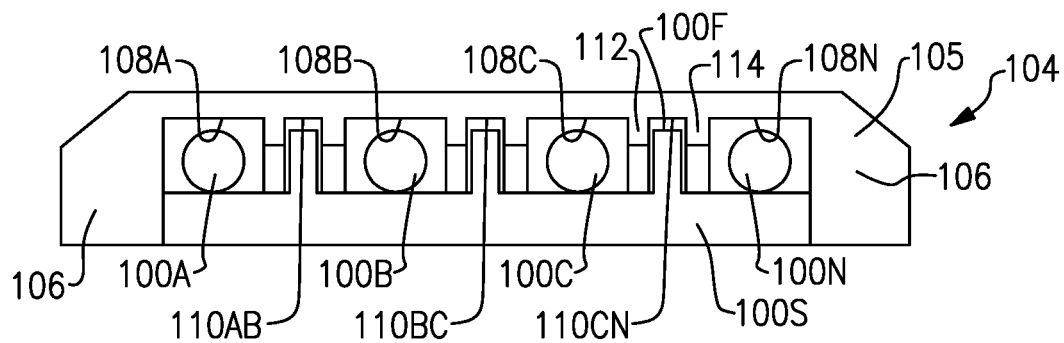
FIG. 2A shows a first detail of the FIG. 1B connection.

FIG. 2A shows the terminal block cover 104 having opposed thick ends 106 and intermediate connection channels 108A, 108B, 108C, and 108N for receiving the connections 100A, 100B, 100C, and 100N, respectively. Intermediate spacing channels 110AB, 110BC, and 110CN separate each of the connections to provide increased creep and lightning protection.

A base or support 100S supports the connections 100A, B, C and N. Support 100S has fingers 100F that extend into the spacing channels 110AB, 110BC, and 110CN.

Figure 2B:
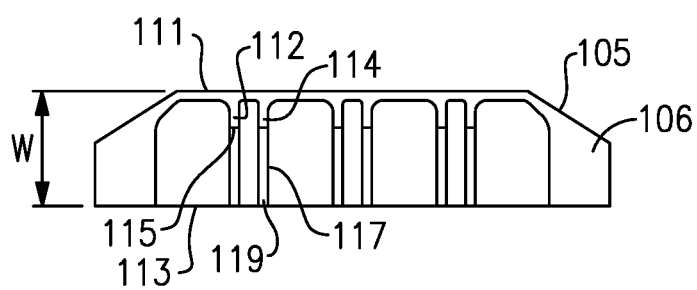
FIG. 2B shows a detail of a terminal block cover.

As shown in FIG. 2B, a closed outer face 111 of the terminal block cover 104 is spaced from an inner open face 113 by a width W.

Figure 2C:
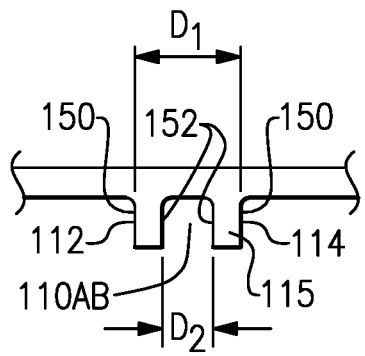
FIG. 2C shows a further detail.

FIG. 2C shows a detail of the spacing channel 110AB. The channel 110AB is defined by spaced ribs 112 and 114. A lateral distance D2 between the outer sides 150 of the ribs is shown. Also, a lateral distance D3 across the interior of the channel 110AB, or between interior inner facing sides 152 of the ribs, is shown. Each of the channels 110AB, 110BC, and 110 CG extends for the same distance and has the same dimensions $D_1$ and $D_2$.

In one embodiment, W was 1.659 inches (4.21 centimeters), $D_1$ was 0.530 inch (1.34 centimeter), and $D_2$ was 0.280 inch (0.71 centimeter). Each of these dimensions comes with a manufacturing tolerance of plus/minus 0.01 inch (0.025 centimeters).

In embodiments, a ratio of W to $D_2$ is between 5.7 and 6.01. A ratio of W to $D_1$ is between 3.0 and 3.2. A ratio of $D_1$ to $D_2$ is between 1.8 and 2.0.

Figure 2D:
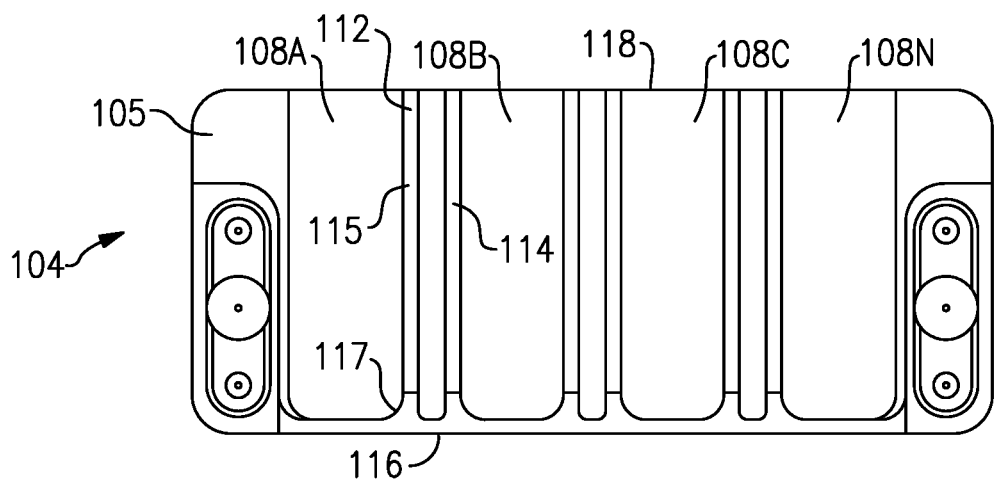
FIG. 2D shows an inner view.

As shown in FIG. 2D, there is also a closed side 116 to the terminal block cover 104 and an open side 118 through which the connection to the electrical connections 102 will be made. The channels 108 and 110 extend between these sides.

As can be appreciated from FIGS. 2B and 2D, the ribs 112 and 114 do not extend all the way to the inner open face 113. Rather, they end at a location spaced closely from the closed outer face 111. This is true at least at the open side 118. At the open side 116, within the interior of the cover 104, the ribs 112 and 114 curve around the inner surface of the cover 104. There are sections 117 and 119 as shown in FIG. 2B.

Figure 2E:
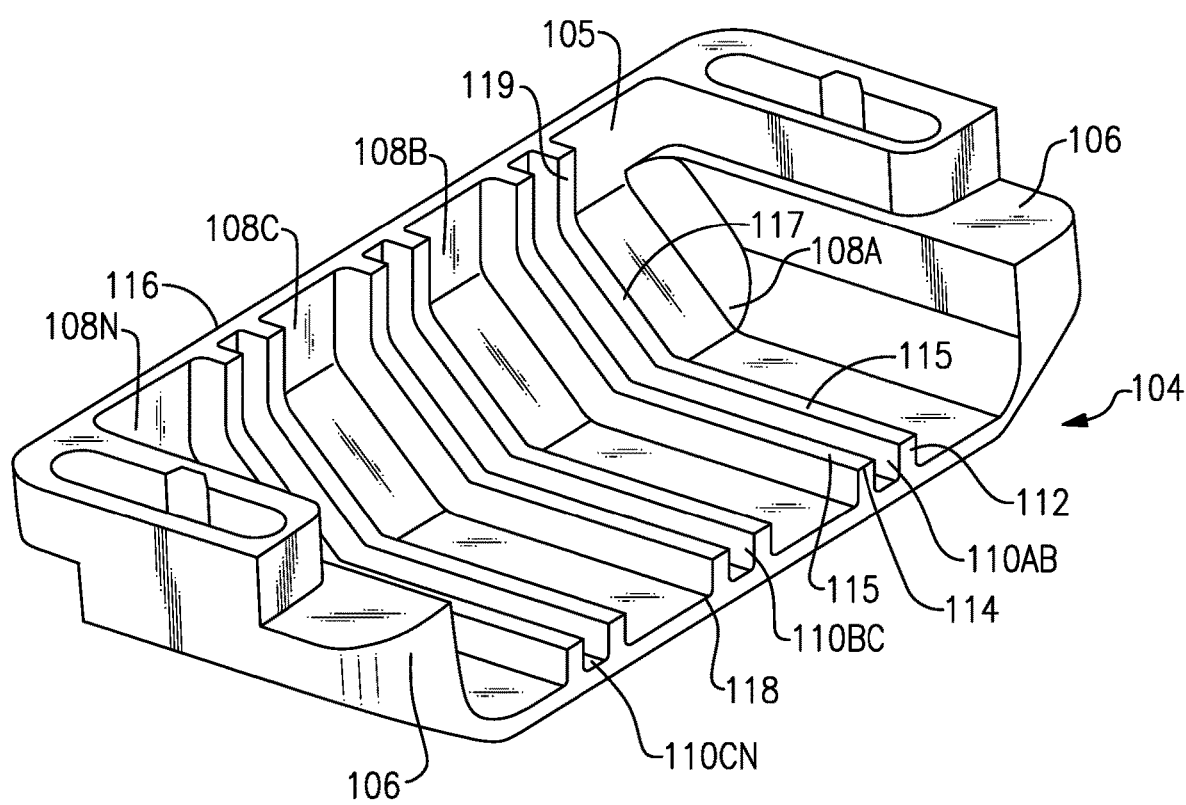
FIG. 2E shows an inner perspective view.

FIG. 2E shows a perspective view, showing the relative location of portions 115, 117 and 119 of the ribs 112 and 114. As can be seen, the portions 115 extend from the open side 118, toward the closed side 116, and merge into section 117. Section 117 extends at a non-perpendicular and non-parallel angle relative to section 115, and merges into section 119. Section 119 extends at a non-perpendicular and non-parallel angle relative to section 115. Section 119 is generally perpendicular to section 115.

The support fingers 100F thus isolate the adjacent connections 100A, 100B, 100C, and 100N. The spacing channels, and ribs 112/114 provide support for the support fingers 100F.

A method of replacing a terminal block cover includes the steps of removing an existing terminal block cover from an integrated drive generator including an input shaft for providing a drive input to a carrier shaft. The carrier shaft provides a drive input into a gear differential and into a main generator. The main generator supplies three phases of electrical power to three electrical connections at a terminal connection, and the existing terminal block cover covering said three electrical connections and a neutral connection. The existing terminal block cover is then replaced with a replacement terminal block cover, including a body having a closed outer face and extending to an open inner face, and having an open side and a closed side. There are four connection channels for receiving electric connections for each of three phases of power and a neutral, and extending from said closed side to said open side. Spacing channels are formed between adjacent ones of each of the four connection channels, with the spacing channels being formed by two spaced ribs within an interior space.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A terminal block cover for use in an integrated drive generator comprising:
   a body having a closed outer face and extending to an open inner face, and having an open side and a closed side, there being four connection channels for receiving electric connections for each of three phases of power and a neutral, and extending from said closed side to said open side, and there being spacing channels formed between adjacent ones of each of said four connection channels, with said spacing channels being formed by two spaced ribs within an interior space;
   wherein outer sides of said ribs are spaced by a first distance, and there being a second distance between interior facing sides of said ribs, and a ratio of said first distance to said second distance being between 1.8 and 2.0;
   wherein a width of said terminal block cover is defined between said open inner face and said closed outer face and a ratio of said width to said second distance being between 5.7 and 6.1; and
   wherein a ratio of said width to said first distance being between 3.0 and 3.2.

2. The terminal block cover as set forth in claim 1, wherein the body having opposed thick ends, with the four connection channels and spacing channels being intermediate said opposed thick ends.

3. An integrated drive generator comprising:
   an input shaft connected to a carrier shaft, said carrier shaft connected to a gear differential, and into a main generator, said main generator including a power output configured for providing three phases of electrical power to an outlet, and there being a terminal block cover covering electrical connections for three phases of electrical power and an electrical connection for a neutral, there being a connection support on an opposed side of said electrical connections from said terminal block cover;
   said terminal block cover including a body having a closed outer face and extending to an open inner face, and having an open side and a closed side, there being four connection channels receiving said electric connections for each of three phases of power and neutral, and said connection channels extending from said closed side to said open side, and there being spacing channels formed between adjacent ones of each of said four connection channels, with said spacing channels being formed by two spaced ribs within an interior space;
   said connection support having support fingers extending into each said spacing channel; and
   wherein outer sides of said ribs are spaced by a first distance, and there being a second distance between interior facing sides of said ribs, and a ratio of said first distance to said second distance being between 1.8 and 2.0.

4. The integrated drive generator as set forth in claim 3, wherein a width of said terminal block cover is defined between said open inner face and said closed outer face and a ratio of said width to said second distance being between 5.7 and 6.1.

5. The integrated drive generator as set forth in claim 4, wherein a ratio of said width to said first distance being between 3.0 and 3.2.

6. The integrated drive generator cover as set forth in claim 5, wherein the body having opposed thick ends, with the four connection channels and spacing channels being intermediate said opposed thick ends.

7. The integrated drive generator cover as set forth in claim 4, wherein the body having opposed thick ends, with the four connection channels and spacing channels being intermediate said opposed thick ends.

8. The integrated drive generator cover as set forth in claim 3, wherein the body having opposed thick ends, with the four connection channels and spacing channels being intermediate said opposed thick ends.

9. A method of replacing a terminal block cover comprising the steps of:
   a) removing an existing terminal block cover from an integrated drive generator including an input shaft connected to a carrier shaft, said carrier shaft connected to a gear differential, and into a main generator, said main generator configured for providing three phases of electrical power to three electrical connections at a terminal connection, and said existing terminal block cover covering said three electrical connections and a neutral connection, there being a connection support on an opposed side of said electrical connections from said terminal block cover; and
   b) replacing said existing terminal block cover with a replacement terminal block cover, said replacement terminal block cover including a body having a closed outer face and extending to an open inner face, and having an open side and a closed side, there being four connection channels for receiving electric connections for each of three phases of power and a neutral, and extending from said closed side to said open side, and there being spacing channels formed between adjacent ones of each of said four connection channels, with said spacing channels being formed by two spaced ribs within an interior space, and with said connection support having support fingers extending into each said spacing channel; and wherein outer sides of said ribs are spaced by a first distance, and there being a second distance between interior facing sides of said ribs, and a ratio of said first distance to said second distance being between 1.8 and 2.0.

10. The method of replacing a terminal block cover as set forth in claim 9, wherein a width of said terminal block cover is defined between said open inner face and said closed outer face and a ratio of said width to said second distance being between 5.7 and 6.1.

11. The method of replacing a terminal block cover as set forth in claim 10, wherein a ratio of said width to said first distance being between 3.0 and 3.2.

12. The method of replacing a terminal block cover as set forth in claim 11, wherein the body having opposed thick ends, with the four connection channels and spacing channels being intermediate said opposed thick ends.

13. The method of replacing a terminal block cover as set forth in claim 9, wherein the body having opposed thick ends, with the four connection channels and spacing channels being intermediate said opposed thick ends.

* * * * *